United States Patent [19]

Ho et al.

[11] Patent Number: 5,468,532
[45] Date of Patent: Nov. 21, 1995

[54] MULTILAYER GRAPHIC ARTICLE WITH COLOR LAYER

[75] Inventors: Chia-Tie Ho, Woodbury, Minn.; Carl W. McMullen, Roberts, Wis.; Raymond M. Sawka, Woodbury, Minn.

[73] Assignee: Minnesota Mining and Manufacturing Company, St. Paul, Minn.

[21] Appl. No.: 988,759

[22] Filed: Dec. 10, 1992

[51] Int. Cl.$^6$ .............................. B32B 7/12; B32B 27/36
[52] U.S. Cl. ...................... 428/40; 428/334; 428/354; 428/480; 428/483
[58] Field of Search .................. 428/334, 40, 423.3, 428/423.7, 424.2, 424.8, 354, 480, 483

[56] References Cited

U.S. PATENT DOCUMENTS

| | | | |
|---|---|---|---|
| 3,681,515 | 8/1972 | Mildner | 174/107 |
| 3,795,540 | 3/1974 | Mildner | 117/226 |
| 4,001,159 | 1/1977 | Imal et al. | 260/29.6 |
| 4,139,514 | 2/1979 | Bassett | 260/29.6 |
| 4,214,028 | 7/1980 | Shortway et al. | 428/159 |
| 4,384,065 | 5/1983 | Wong | 524/322 |
| 4,513,107 | 4/1985 | Fabbrini | 524/56 |
| 4,542,078 | 9/1985 | Fitzer et al. | 428/914 |
| 4,565,842 | 1/1986 | Fitzer et al. | 524/57 |
| 4,605,592 | 8/1986 | Paquette et al. | 428/334 |
| 4,615,754 | 10/1986 | Waugh et al. | 156/242 |
| 4,645,556 | 2/1987 | Waugh et al. | 156/242 |
| 4,737,224 | 4/1988 | Fitzer et al. | 156/240 |
| 4,737,225 | 4/1988 | Waugh et al. | 156/242 |
| 4,762,875 | 8/1988 | Gold | 524/248 |
| 4,889,765 | 12/1989 | Wallace | 428/290 |
| 4,908,063 | 3/1990 | Baker et al. | 106/31 |
| 4,954,556 | 9/1990 | Bull et al. | 524/378 |
| 4,973,617 | 11/1990 | Incostro et al. | 524/187 |
| 4,980,408 | 12/1990 | Chan | 524/504 |
| 5,034,275 | 7/1991 | Pearson et al. | 428/336 |
| 5,037,680 | 8/1991 | Papendick et al. | 428/31 |
| 5,098,478 | 3/1992 | Krishnan et al. | 106/23 |

FOREIGN PATENT DOCUMENTS

| | | |
|---|---|---|
| 0266109 | 4/1988 | European Pat. Off. . |
| 2074434 | 3/1990 | Japan . |
| WO85/01052 | 3/1985 | WIPO . |
| WO92/20534 | 11/1992 | WIPO . |

OTHER PUBLICATIONS

"PRIMACOR, High Performance Polymer, Water Borne Coatings", The Dow Chemical Company Product Literature Brochure. Revised Feb., 1987.
"Adhesives and Coatings, Adcote™50T4990", Morton International Product Literature. May, 1988.
"Adhesives and Coatings, Adcote™ 50T4983", Morton International Product Literature. Dec., 1988.
"NeoRez XR–9679", ICI Resins U.S. Technical Information Product Literature.
"Neorez XR–9649", ICI Resins U.S. Technical Information Product Literature.

Primary Examiner—George F. Lesmes
Assistant Examiner—Blaine R. Copenheaver
Attorney, Agent, or Firm—Gary Griswold; Walter N. Kirn; Steven E. Skolnick

[57] ABSTRACT

A multilayer graphic article comprises a substrate, at least one color layer disposed on the substrate, and a protective surface layer that overlies the substrate and the color layer. The color layer is visible through the surface layer and comprises a color agent in a copolymeric binder. The binder comprises the copolymerization product of an olefinic monomer and a second monomer having a pendant carboxyl group. The substrate may be a polymeric film, an adhesive or a temporary, removable liner. The protective surface layer may be formulated to impart interior surface protection properties to the graphic article or it may be formulated to render the graphic article weatherable and resistant to chemical exposure.

35 Claims, 1 Drawing Sheet

MULTILAYER GRAPHIC ARTICLE WITH COLOR LAYER

BACKGROUND OF THE INVENTION

1. Field of the Invention

In general, this invention relates to multilayer graphic articles and, more particularly, to multilayer graphic articles which comprise a substrate, a color layer disposed on the substrate, and an overlying protective surface layer.

2. Description of Related Art

Multilayer graphic articles may be applied to a variety of surfaces for decorative, informational, and/or functional reasons. These multilayer constructions often contain one or more continuous or non-continuous color layers coated, printed or laminated on a plastic film, which itself may be colored.

Decorative graphic articles are typically highly contrasting polychromatic constructions that enhance the visual appeal of surfaces to which they are applied, such as motor vehicles, marine craft, commercial or residential real estate, signs, store displays and the like. Informational graphic articles provide directions, location indicia, instructions, and identification when used, for example, to construct road signs and license plates. Functional graphic articles impart weather protection and wear resistance to surfaces to which they are applied, especially outdoor surfaces.

Color layers in presently known graphic articles often contain a poly(vinyl chloride) (PVC) binder blended with various color agents, volatile solvents and plasticizers. PVC solvents typically provide from 40 to 60 weight percent (wt. %) of the color layer formulation. However, for various environmental and health reasons, it is desirable to reduce or eliminate the use of these solvents. Similarly, it is desirable to reduce or eliminate the use of PVC plasticizers. Plasticizers can migrate into adjacent layers of the graphic and cause visual changes to both the color layer and surrounding surfaces. The physical stability of the color layer may be adversely affected. Finally, PVC plasticizers are not considered environmentally friendly.

Presently known color layer formulations are compatible with only a limited class of substrates, primarily PVC, acrylics and urethanes. These substrates can have poor flexibility and PVC is not environmentally desirable.

Accordingly, a substantial need exists for eliminating or reducing the use of PVC-based materials (and their associated solvents and plasticizers) in both color layer formulations and graphic articles.

SUMMARY OF THE INVENTION

In general, this invention relates to a multilayer graphic article comprising a substrate, at least one color layer disposed on the substrate, and a protective surface layer that overlies the substrate and the color layer, the color layer being visible through the surface layer. The color layer comprises a color agent in a copolymeric binder. Broadly, the binder comprises the copolymerization product of an olefinic monomer (preferably ethylene) a second monomer having a pendant carboxyl group (preferably acrylic or methacrylic acid). The first monomer provides from 99 to 70 mol-% (more preferably, 91 to 97 mol-%) while the second monomer correspondingly provides from 1 to 30 mol-% (more preferably from 9 to 3 mol-%) of the binder. The copolymeric binder may be supplemented with a secondary binder such as a polyurethane dispersion.

Numerous color agents are useful within the scope of the invention including organic pigments, inorganic pigments, metallic (for example, aluminum) flakes, pearlescent materials, inks and dyes.

The graphic article may include multiple color layers each of which may be continuous or discontinuous relative to the substrate on which it is disposed and any other color layers in the graphic article. Such constructions are particularly preferred for providing multicolored graphic articles.

The substrate on which the color layer(s) is disposed may be provided by materials as varied as a polymeric film, an adhesive, or a temporary, removable, liner. Useful polymeric film substrates includes alpha-olefins, ethylene-modified copolymers and terpolymers, polyurethanes, and rubbery polymers. However, ionomers of olefin/vinyl carboxylate copolymers such as ionomers of ethylene/acrylic acid and ethylene/methacrylic acid copolymer are preferred. Even those constructions which include a polymeric film substrate may comprise an adhesive, such as a pressure sensitive adhesive, for bonding the graphic article to a surface.

The protective surface layer may be formulated so as to provide the graphic article with interior surface protection properties; that is, resistance to interior cleaning solutions, food, cosmetics, etc. Surface layer materials which provide interior surface protection properties include, for example, polyurethane-based materials that comprise the reaction product of an aromatic diisocyanate and a polyether polyol.

Alternatively, the protective surface layer may be formulated to render the graphic article weatherable and resistant to chemical exposure. In this regard, polyurethane-based materials, such as the reaction product of an aliphatic diioscyanate and either a polyester polyol, a polycarbonate polyol or a polyacrylic polyol are preferred.

The graphic articles of the invention may be applied to a wide variety of substrates including motor vehicles, marine craft, snowmobiles, sign faces and the like.

BRIEF DESCRIPTION OF THE DRAWINGS

The invention will be more fully appreciated with reference to the following drawings in which similar reference numerals designate like or analogous components throughout and in which.

DETAILED DESCRIPTION OF THE PREFERRED EMBODIMENTS

In a broad aspect of the invention, the multilayer graphic article comprises a substrate, a color layer disposed on the substrate, and a clear or transparent, protective surface layer that overlies both the color layer and the substrate. The color layer may comprise several independent color layers and may be positioned between the surface layer and the substrate or beneath both the surface layer and the substrate. In embodiments of the former kind, the substrate can be permanent or temporary. Consequently, the substrate may be as varied as a polymeric film, an adhesive layer, or a temporary liner. The protective surface layer may be formulated to render the graphic article suitable for use in outdoor environments or it may be designed for less demanding interior applications. By "clear" or "transparent" it is meant that the underlying color layer(s) can be seen through the surface layer such that the surface layer does not detract from the appearance of the color layer(s).

Figure 1:
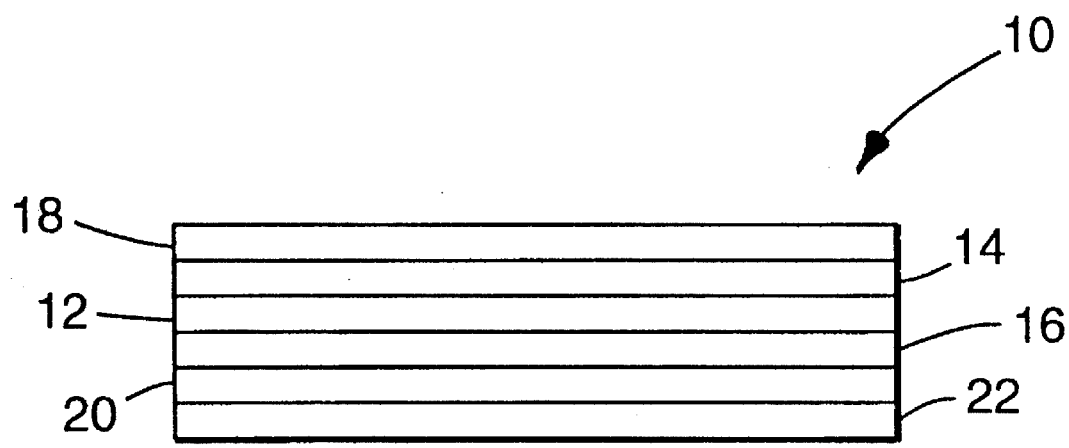
FIG. 1 is an enlarged elevational view of one embodiment of a multilayer graphic article according to the invention and showing several optional layers thereof.

The many embodiments of the present invention will be more easily understood with reference to the following description and the accompanying drawings. Turning now to the drawings, FIG. 1 illustrates one embodiment of a multilayer graphic article 10 according to the invention, the illustrated embodiment including several optional elements, as will be explained more fully hereinbelow. Graphic article 10 comprises a first color layer 12 and a second color layer 14 disposed on a substrate such as a polymeric film layer 16. A clear protective surface layer 18 overlies both film layer 16 and color layers 12 and 14. Graphic article 10 further comprises an adhesive layer 20 and a temporary, removable release liner 22 that protects the adhesive.

In a broad embodiment of the invention, only one of color layers 12 and 14 need be provided. However, in many preferred graphic articles, more than one color layer is desirable, especially where a multicolored graphic article is sought. Similarly, whereas FIG. 1 illustrates two color layers 12 and 14, the invention is not so limited and graphic articles according to the invention may comprise three or more color layers, the specific number often being dictated by the desired visual appearance, manufacturing simplicity, cost, and the like.

Furthermore, each color layer may be continuous or discontinuous relative to the substrate on which it is disposed and any other color layers in the article. Discontinuous color layers are especially preferred in constructions utilizing more than one color layer so as to permit the several different color layers to be viewed simultaneously.

In general, each color layer may be provided by a similar formulation. Consequently, the following discussion of the composition of color layers useful in the invention pertains equally to color layers 12 and 14 (as well as other color layers which may be included in the graphic articles but which are not separately illustrated in the drawings).

Color layers useful in the invention may be provided by an aqueous solution, emulsion or dispersion comprising a binder, a color agent, and various optional ingredients. Whether a mixture is classified as an aqueous solution, a microdispersion, a microemulsion, a dispersion or an emulsion depends primarily on the particle size of the material in the continuous phase. The binder includes a copolymeric binder that preferably comprises the copolymerization product of an olefinic monomer and a second monomer containing a pendant carboxyl group. These copolymeric binders have the following formula:

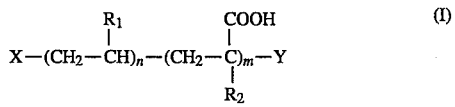

wherein $R_1$ is either H or a $C_{1-6}$ alkyl group; $R_2$ is H, a $C_{1-6}$ alkyl group, —CN, an ester group, or $R_3$—COOH, wherein $R_3$ is any alkyl group; X and Y are independently a residue of the olefinic monomer or a residue of the second monomer; n is a number selected such that the olefinic monomer provides from about 70 to 99 mole percent (mol-%) of the copolymeric binder; and m is a number selected such that the second monomer correspondingly provides from about 1 to 30 mol-% of the copolymeric binder.

Advantageously, such materials may display hot melt adhesive properties which provide manufacturing benefits as explained below. Consequently, the utility of these materials as binders may be influenced by their melt index which preferably is selected to provide good quality hot melt adhesive characteristics. If the melt index is too high, the resulting binder may be too soft, have reduced temperature resistance, and may not be creep resistant. On the other hand, if the melt index is too low, the binder may be too stiff to be useful as a hot melt adhesive and may not form a good bond to substrate on which it is disposed. Within these guidelines, a melt index (as measured by ASTM-1238-88) of about 50 to 2000 is preferred, with a melt index of about 50 to 1500 even more preferred. (While the melt index has been expressed as a function of the binder, the addition of a color agent or other material is not expected to significantly alter the melt index of the color layer. Consequently, the melt index of the binder may also be regarded as indicative of the melt index of the color layer as a whole.)

The most preferred copolymeric binders are ethylene acrylic acid and ethylene methacrylic acid copolymers. In these materials, the ethylene monomer preferably provides from about 91 to 97 mol-% of the binder while the acrylic acid or methacrylic acid monomer (as the case may be) correspondingly provides from about 3 to 9 mol-%.

Suitable, commercially available copolymeric binders include Adcote™-50T4983 having approximately 20 wt. % (9 mol-%) acrylic acid and a melt index of 300, Adcote-50T4990 having 20 wt. % acrylic acid (9 mol-%) and a melt index of 1300, and Adcote™-56220 having 13 wt. % (7.5 mol-%) methacrylic acid and a melt index of 60. Each of these materials is available from Morton International. Also useful is MICAG™-927 having 20 wt. % acrylic acid (9 mol-%) and a melt index of 300, available from Mica Corp.

The commercially available copolymeric binders are typically provided as a salt in which the carboxylic acid functionality has been neutralized with a base so as to improve the aqueous dispersibility of the resin. Consequently, it will be understood that formula I above includes basic thereof. Useful bases for neutralizing the carboxylic acid functionality include ammonia and other amines. Sodium hydroxide and potassium hydroxide may also be used but are less preferred due to concerns of moisture sensitivity and non-evaporation of the metal ion.

The copolymeric binder may be blended or supplemented with an additional, secondary binder to improve the tensile strength, heat resistance, and environmental weather resistance of the color layer as well as its adhesion to the substrate on which it is disposed. Particularly useful in this regard are polyurethane dispersions that comprise the reaction product of an aliphatic or aromatic polyisocyanate (preferably a diisocyanate) and an active hydrogen containing material such as a polyether polyol or, more preferably, a polyester polyol or a polycarbonate polyol. Such reactive systems may also include short chain diols (e.g., 1,4 butanediol) and/or short chain diamines to modify polymer properties.

The color layer further comprises a color agent such as colored (including white and black), fluorescent, organic and inorganic pigments; metallic, for example, aluminum, flakes; pearlescent materials; inks; dyes and the like.

Optionally, the copolymeric binder may be crosslinked. By crosslinking the carboxyl functionality of the binder with either covalent or ionic crosslinking agents, various physical properties of the color layer can be beneficially influenced. For example, by controlling the amount of crosslinking, the stiffness (i.e., modulus), dimensional stability (in response to changes in temperature and humidity), hot melt adhesive properties (e.g., melting temperature), tensile strength, adhesion and heat resistance can be improved.

Useful covalent crosslinking agents typically comprise polyfunctional aziridines, polyfunctional carbodiimides, epoxies, melamines, or mixtures of these agents. However, the binder is preferably crosslinked with a monovalent or polyvalent ionic crosslinking agent. Ionic crosslinking is preferred because at elevated temperatures the ionic bonds reversibly dissociate thereby permitting thermoplastic lamination of the color layer to a substrate, the hot melt adhesive properties of the copolymeric binder being useful in this regard.

Ionic crosslinking agents are preferably based on metal cations including cations of lithium, sodium, potassium, calcium, barium, titanium, zirconium, iron, aluminum, zinc and other similarly reacting metals. These crosslinking agents are often supplied as aqueous dispersible salts or organometallic complexes. In a salt the metal cation is combined with any of a number of anionic materials such as chloride, nitrate, sulfate, borate, phosphate, acetate, octanoate, stearate, oleate, and methoxy ethoxy carbonate oxide as well as other organic and inorganic anions. Suitable organometallic complexes include zinc oxide, zirconium dioxide, magnesium oxide, aluminum oxide, and calcium oxide.

Highly preferred ionic crosslinking agents are based on zirconium and include zirconium hydroxide, zirconium nitrate, zirconium dioxide, silicate, zirconium sulfate, zirconium carbonate, zirconium acetate, and ammonium zirconium carbonate.

The crosslinking agent (whether ionic or covalent) is typically included at a level of from about 0 to 35 parts per 100 parts (phr) of the copolymeric binder, more preferably 0.05 to 10 phr, and most preferably 0.1 to 4.5 phr.

Other optional additives which can be incorporated into the color layer include cosolvents, surfactants, defoamers, antioxidants, light stabilizers, ultraviolet light absorbers, biocides, etc. Surfactants can improve the dispersibility of the color agents in the binder prior to application of the color layer to a substrate and can improve wet out of the color layer.

With continued reference to FIG. 1, graphic article 10 further comprises a substrate. As noted above and as explained more fully below, the substrate may take various forms. In the embodiment of FIG. 1, the substrate comprises a polymeric film 16 that enhances the strength and/or flexibility of the graphic article. Materials suitable for providing a polymeric film substrate include alpha-olefins such as polyethylene, polypropylene, and blends and copolymers thereof; ethylene modified copolymers such as ethylene-vinyl acetate, ethylene-acrylic acid, ethylene-methacrylic acid, ethylene-methylacrylate and blends and mixed polymers of these materials such as ethylene-methylacrylate-acrylic acid terpolymers; polyurethanes; poly(vinyl chloride); and rubbery polymers such as ethylene propylene diene monomer terpolymer, rubber modified polyolefins (e.g., ethylene-propylene rubber, olefins, etc.), and styrene-butadiene rubber.

Particularly preferred substrates include ionomers of olefin/vinyl carboxylate copolymers such as ethylene-acrylic acid and ethylene-methacrylic acid copolymers combined with various metal cations including cations of lithium, sodium, potassium, zinc, aluminum and calcium. Suitable commercial ionomer resins include the Surlyn™ family of materials available from E.I. dupont de Nemours & Co.

Referring again to FIG. 1, graphic article 10 optionally, though highly preferably, includes an adhesive layer 20. Conventionally, adhesive layer 20 bonds graphic article 10 to a surface (not shown separately in the drawings). As noted above, film layer 16 is also an optional element of graphic article 10 and, in conjunction with FIG. 1, was described as the substrate upon which the color layers were disposed. If film layer 16 is not provided but adhesive layer 20 is provided, then the adhesive layer may function as the substrate for the color layers.

Adhesive 20 may be provided by any of a wide variety of adhesives conventionally employed to bond graphic articles to a surface. Pressure-sensitive adhesives are particularly useful in this regard. Adhesives based on acrylics, natural rubbers, styrene-isoprene-styrene block copolymers, and silicone-based adhesives such as polydimethylsiloxane and polymethylphenylsiloxane may be used. Adhesives useful in the invention may incorporate additives such as ground glass, titanium dioxide, silica, glass beads, waxes, tackifiers, low molecular weight thermoplastics, oligomeric species, plasticizers, metallic flakes, metallic powders, etc. so long as they are provided in an amount that does not materially adversely affect the ability of the adhesive to bond the graphic film to a surface.

The surface of the adhesive which is to be applied to a substrate may be treated to permit repositioning of the graphic article before a permanent bond is formed. Adhesive respositionability may be achieved by providing a layer of minute glass bubbles on the adhesive surface, as illustrated in U.S. Pat. No. 3,331,729 to Danielson et al.

Also shown in FIG. 1 is a removable liner 22 which typically functions to protect adhesive layer 20 from dirt and other contaminants prior to application of graphic article 10 to a surface. Useful liners include silicone coated paper or polymeric films. If neither film layer 16 nor adhesive layer 20 is provided, liner 22 may function as the substrate for the color layer(s).

With continuing reference to FIG. 1, transparent, protective surface layer 18 may be provided by various materials, depending in significant part on the degree of protection which must be afforded to underlying layers of the graphic article and, to a lesser extent, the nature of the graphic article. For example, graphic articles intended for outdoor use may need to be weatherable, abrasion resistant, and resistant to chemical exposure. Graphic articles intended for interior use may be exposed to less harsh conditions.

In general, polyurethane-based surface layers are useful. Polyurethane-based surface layers comprise the reaction product of a polyisocyanate and an active hydrogen containing material. Aliphatic and aromatic polyisocyanates may be used. The former are preferred for exterior applications; the latter are preferred for interior uses as discussed below. Suitable aliphatic diisocyanates may be selected from isophorone diisocyanate, 1,6-hexamethylene diisocyanate and bis-(4-isocyanato cyclohexyl)methane, and 1,4-cyclohexyl diisocyanate. Useful aromatic polyisocyanates include diphenylmethane-4,4'-diisocyanate, toluene diisocyanate, p-tetramethylxylene diisocyanate, and naphthalene diisocyanate.

Useful active hydrogen containing compounds include polyester polyols, polycarbonate polyols and polyacrylic polyols, as well as blends of any of these materials for exterior applications and, for interior uses, polyether polyols.

Reactive systems for providing polyurethane-based surface layers may include short chain diols (e.g., 1,4-butane diol) and short chain diamines (e.g., ethylene diamine) for modifying polymer properties. It will be understood that the concept of a polyurethane reaction product encompasses the presence of such materials.

Two-part, solvent-based polyurethanes provide useful surface layers. Conventional solvent systems include those which use xylene, methyl isobutyl ketone, methyl ethyl ketone, glycol ethers such as propylene glycol monomethylether acetate and diethylene glycol ethylether acetate, as well as blends and mixtures of the foregoing materials.

However, aqueous-based polyurethane dispersions are preferred because they are more environmentally compatible than their solvent-based counterparts. Aqueous-based polyurethane dispersions may contain minor amounts of organic cosolvents.

Polyurethane-based surface layers having utility in the invention include polyurethane/acrylic resin dispersion blends and polyurethane/aqueous epoxy blends. In these blends, the polyurethane component predominates and provides a continuous phase in which are dispersed islands or microdomains of the acrylic or epoxy component. The acrylic or epoxy component typically provides no more than about 25 to 30% of the blended surface layer.

Surface layers useful for outdoor environments may also be used for interior applications. However, various non-polyurethane-based protective surface layers may also be used indoors. Such materials include olefin/vinyl carboxylic acid copolymers such as ethylene/acrylic acid and ethylene/methacrylic acid copolymer as well as ionomeric versions thereof in which the copolymers have been combined with various metal cations, including cations of lithium, sodium, potassium, zinc, aluminum and calcium. The Surlyn™ family of ionomer resins are suitable commercial materials. Also useful are polyesters (e.g., polyethylene terephthalate), polyolefins (e.g., polyethylene), ethylene/vinyl acetate, and ethylene/methylacrylate.

Figure 2:
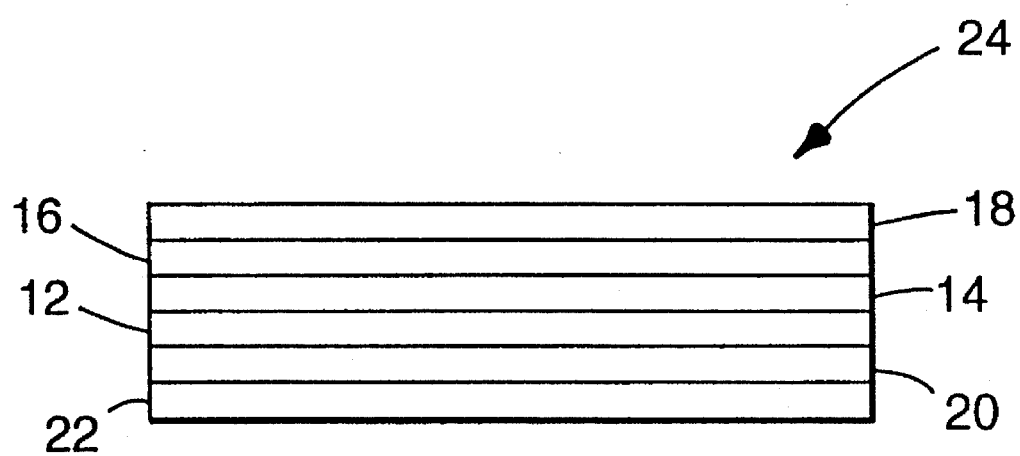
FIG. 2 is an enlarged elevational view of a second embodiment of a multilayer graphic article according to the invention and showing several optional layers thereof.

Turning now to FIG. 2, there is illustrated a second embodiment of a multilayer graphic article 24 according to the invention. Graphic article 24 comprises a first color layer 12, a second color layer 14, a polymeric film layer 16, a transparent protective surface layer 18, an adhesive layer 20, and a removable liner 22, all as described more fully above. The construction of FIG. 2 differs from the of FIG. 1 in that the color layers 12 and 14 are positioned below polymeric film layer 16 rather than above, such a construction sometimes being referred to as a "buried graphic." Buried graphics afford underlying color layers 12 and 14 additional protection against environmental weathering, chemical exposure and abrasion relative to the construction of FIG. 1 because both protective surface layer 18 and polymeric film layer 16 are present. In FIG. 2 either film layer 16 or adhesive layer 20 may be regarded as the substrate on which the color layers are disposed.

The multilayer graphic articles of the invention may be readily manufactured in a variety of approaches. For example, a protective surface layer may be prepared and cast onto a removable liner. The color layer may be applied to the surface layer by direct coating, hot transfer lamination or screen printing. If multiple color layers are included they may be applied sequentially. If the color layer includes pearlescent materials or metallic flakes as a color agent, application of the color layer by hot transfer lamination is preferred.

Alternatively, the color layer and the surface layer may be coated in tandem. Tandem coating can be a two-stage process of coating, drying or partially drying the surface layer followed by overcoating and drying the color layer. Another tandem coating process involves simultaneously coating the surface layer and the color layer from a laminar flow coater. The adhesive may then be coated onto the color layer or separately cast onto a removable liner and transfer laminated to the color layer.

Furthermore, the order of the manufacturing steps may be varied. For example, the adhesive can be cast and dried on a removable liner and then overcoated with the color layer or the two materials may be tandem coated. The surface layer can then be coated, sprayed or screen printed onto the color layer and dried. Alternatively, the surface layer may be laminated to the color layer.

Furthermore, although not shown separately in the drawings, the multilayer graphic article may include one or more tie layers between otherwise adjacent layers of the construction. Tie layers may be incorporated to enhance adhesion between the otherwise adjacent layers in the event that there is insufficient adhesion therebetween. Tie layer materials may be coated onto previously formed or provided layers which comprise the multilayer graphic article or may be coextruded therewith depending on the particular means of manufacturing the article. Suitable tie layer materials may include maleic anhydrides grafted on polypropylenes, ethylene acrylic acid copolymers, polyurethanes, ethylene/vinyl alcohol copolymers, and melamine acrylics.

Alternatively, adhesion between adjacent layers of the article may be promoted through various oxygenating treatments such as corona discharge and plasma exposure. In such instances, the further inclusion of tie layers may be unnecessary.

For those constructions which include a polymeric film layer substrate, the film layer may be cast, extruded, calendared or blown and subsequently primed or otherwise treated to improve adhesion to subsequently applied layers, if necessary. The color can be coated, screen printed or transfer laminated to the film layer as can the protective surface layer and the adhesive. The order of these manufacturing steps may be varied. For example, the film layer maybe extruded onto a previously provided color layer. In general, manufacturing procedures in which the color layer is involved in transfer lamination are desirable because they beneficially utilize the hot melt adhesive characteristics of the color layer binder.

The multilayer graphic articles of the invention may be applied to many structures. The structures may be flat or have a compound, contoured surface in three dimensions. For application to these latter complex surfaces, the graphic article needs to be sufficiently flexible to conform thereto without delaminating or lifting off. The actual requisite flexibility will depend in large part on the nature of the structure surface. Some common structures encountered in the automotive industry include bumper facia, pillar posts, rocker panels, wheel covers, door panels, trunk and hood lids, mirror housings, dashboards, floormats, door sills, etc. The graphic article 10 typically includes adhesive layer 20 which is conventionally protected by removable release liner 22. The graphic article is applied to the structure, preferably in a single continuous motion, by simultaneously removing the release liner and applying the article in a smooth, flat manner. The graphic article may be squeegeed flat to remove any entrapped air and to provide a good adhesive bond with the underlying substrate.

Graphic articles according to the invention be applied to automobiles, trucks, motorcycles, trains, airplanes, marine vehicles and snowmobiles. However, the invention is not limited to vehicular settings and may be used anywhere a multilayer decorative, functional or informational graphic article is desirable, including both indoor and outdoor environments. If desired the invention may be used to provide colored retroreflective articles by forming a color layer on a retroreflective substrate.

For indoor uses, protective surface layer 18 may be formulated to impart interior surface protection properties to the graphic article. As noted above, polyurethane-based materials comprising the reaction product of aromatic diisocyanates and polyether polyols are useful in this regard as are other materials. "Interior surface protection properties" means mar resistance and that the graphic article will not appreciably change in appearance or adhesion when subjected to interior cleaning solutions, food, cosmetics, grease, oil and plasticizers.

With the proper formulation of surface layer 18, the graphic article is particularly suited for use in outdoor environments. Such articles are exposed to a wide variety of harsh, deteriorative conditions such as environmental weathering, chemicals and abrasion. Polyurethane-based surface layers which comprise the reaction product of aliphatic diisocyanates and either polyester polyols, polycarbonate polyols or polyacrylic polyols are useful in this regard because of their ability to provide weathering, chemical and abrasion resistance while remaining flexible. The following tests may be used to evaluate the utility of multilayer graphic articles according to the invention in outdoor environments, especially in conjunction with motor vehicles. These tests are analogous to many which have been adopted or developed by major automobile manufacturers. However, a graphic article which fails to pass every test may still be suitable for outdoor use depending on the requirements for a given application and the standards which have been established by a particular end user. Unless alternative criteria are noted below, a graphic article is considered to have passed a particular test if it shows no objectionable effects including surface deterioration, excessive shrinkage, delamination, edge lifting, gloss or color change, adhesion loss, and cracking or crazing. Necessarily, the results of these tests are somewhat subjective, but such tests have long been used in the automotive industry to characterize exterior durability and observations should be consistent with those standards which have come to be recognized.

In each test, the graphic article includes a pressure sensitive adhesive (typically about 25 to 51 μm thick) for bonding a sample of the graphic article to a test substrate. The nature of the test substrate (its material of construction, whether it is painted, primed, etc.) is typically specified by the end user of the graphic article, although any test substrate specified by an automobile manufacturer may be used. Conventionally, the test substrates are about 30.5 cm×10.2 cm in size with the sample of the graphic article being 8.9 cm ×8.9 cm, except as noted below. Once the sample has been firmly applied to the test substrate, the resulting panel is preconditioned for 24 hours under ambient conditions (23° C. ±2° C., 50% ±5% relative humidity (R.H.)). All tests are performed under ambient conditions unless noted otherwise. Furthermore, all panels are subjected to a 24 hour ambient condition recovery period at the conclusion of the test and before recording observations.

The following tests are not listed in any particular order.

Surface Layer Adhesion; Color Layer Adhesion

Surface layer adhesion and color layer adhesion may be evaluated according to the same test procedure. A series of 11 parallel lines each 1 millimeter (mm) apart is scored on the surface of the color layer or the surface layer, as the case may be. A second series of 11 parallel lines, each 1 mm apart and perpendicular to the first set is scored to create a grid of 100 squares each measuring about 1 mm×1 mm. Each scored line is sufficiently deep to fully penetrate the layer without injury to the underlying layer. Scotch™ brand tape #610 (3M Company) is firmly adhered to the grid and then removed in a rapid, single, continuous motion by pulling at an angle of 90° relative to the panel. Percent adhesion was measured as the proportion of squares of the original 100 that remained. Preferably the adhesion is at least 95% more preferably 100%.

Heat Aging

Panels are exposed for 168 hours at 80°±2°C. in an air-circulating oven.

Dimensional Stability

A graphic article sample may exhibit a shrinkage of no more than 1.0% (more preferably, a shrinkage of no more than 0.5%) in the longitudinal direction following exposure for 30 minutes at 120°±2° C. in a mechanical convection oven. The sample dimensions are measured prior to and after exposure with the initial sample having dimensions of 2.54 cm ×20 cm.

Moisture Resistance

A panel is exposed for 168 hours at 38°±2° C. and 99±1% R.H.

Thermal/Environmental Cycling

A panel is exposed to 2 consecutive cycles each cycle consisting of: (i) 72 hours at 80° C., (ii) 24 hours at 38° C. and 99% ±1% R.H., (iii) 7 hours at −30° C., (iv) 17 hours at 38° C. and 99% ±1% R.H., (v) 7 hours at 80° C., (vi) 24 hours at 38° C. and 99% ±1% R.H., and (vii) 17 hours at −30° C.

Gravel Resistance

A panel, once having completed the thermal/environmental cycle described above, is tested in accordance with SAE J400, January 1985 ("Test for Chip Resistance of Surface Coatings") and evaluated using the SAE J400 rating scale. There should be no evidence of film cut-thru to the test substrate.

Impact Resistance

A panel is conditioned at −30° C. for 4 hours and then is impacted at 2.7 Joules with a Gardner Impact Tester.

Accelerated Weathering

Resistance to environmental weathering (i.e., whether a graphic article is "weatherable" as that term is used herein) may be measured in accordance with SAE J1960 June 89 "Accelerated (G-26 Type BH) Exposure of Automotive Exterior Materials Using a Controlled Irradience Water Cooled Xenon Arc Apparatus" which provides for 2,000 hours of accelerated xenon exposure weathering. The test used 2640 kiloJoules/square meter of energy exposure at 340 nm.

Abrasion Resistance

"Resistance to abrasion"(or "abrasion resistance") as those terms are used herein may be evaluated by subjecting the graphic article to a Teledyne Taber Abraser (Teledyne, Inc.) fitted with a CS-17 abrading wheel carrying a load of 500 grams per head in accordance with SAE J1847. Preferably, the graphic article does not exhibit any wear-thru to the test substrate after 1,000 cycles.

10 Day Water Immersion

A panel is immersed in 31.5° C. water for 10 days. No delamination between the color layer and the surface layer should occur (referred to below as "surface layer delamaination"). There should also be no delamination between the adhesive layer and the layer of the graphic article to which it is adhered (referred to below as "adhesive layer delamination").

A graphic article of the invention may be regarded as "resistant to chemical exposure" (i.e., as having "chemical resistance") as those terms are used herein if it passes the salt spray, fuel resistance, acid resistance and solvent resistance tests described below.

Salt Spray

Resistance to a harsh salt spray is determined by spraying a panel with a 5% salt solution at 35° C. for 168 hours.

Fuel Resistance

A panel is submerged 3 times for 5 minute durations with a 5 minute ambient condition recovery period between submersions in a mixture comprising 60% iso-octane and 40% toluene.

Acid Resistance 3 drops of 0.1N HCl is placed on the sample, covered with a watch glass, and heated for 30 minutes at 38° C. in an air-circulating oven. The panel is allowed to cool and then rinsed. The panel is compared to an unacidified and unheated control panel.

Solvent Resistance

A sample of the graphic article (5.1 cm 12.7 cm) is mounted in an American Association of Textile Chemists and Colorists (A.A.T.C.C.) crockmeter and exposed separately to each of the following fluids: (i) windshield washer solvent (isopropanol/water 1:1 volume:volume), (ii) antifreeze (e.g. ethylene glycol), (iii) car wash detergent, (iv) oil (SAE 20), and (v) #2 diesel fuel. After a 60 second penetration period, the panel is rubbed for 25 cycles according to A.A.T.C.C. Test Method 8-1972, Wet Crocking Test.

The invention will be more fully appreciated with reference to the following nonlimiting examples.

EXAMPLE 1 to 8

A series of eight color layer formulations was prepared as shown below in Table 1. The color layers of examples 1 to 4 and 8 are suitable for coating onto a substrate. Examples 5 to 7 were prepared to permit the color layer to be screen printed onto a substrate. Differences between coatable and screen printable color layers reside largely in the solvent systems. In each example, the component amounts are stated in weight percent.

TABLE 1

| COMPONENT | EXAMPLE | | | | | | | |
|---|---|---|---|---|---|---|---|---|
| | 1 | 2 | 3 | 4 | 5 | 6 | 7 | 8 |
| Ethylene acrylic acid copolymer binder (Adcote ™ 50T4983 available from Morton International) | 77.6 | 69.1 | 71.4 | 20.0 | 69.2 | 0.0 | 65.1 | 61.5 |
| Ethylene methacrylic acid copolymer binder (Adcote ™ 56220 available from Morton International) | 0.0 | 0.0 | 0.0 | 40.0 | 0.0 | 63.1 | 0.0 | 0.0 |
| Aqueous polyurethane dispersion (Neorez ™ XR-9679 available from ICI) | 0.0 | 0.0 | 0.0 | 0.0 | 0.0 | 0.0 | 0.0 | 6.5 |
| Ammonium zirconium carbonate crosslinking agent (Bacote ™-20 available from Magnesium Elektron Inc.) | 1.9 | 1.8 | 1.8 | 1.2 | 1.8 | 1.6 | 1.7 | 1.3 |
| Surfactant (Surfynol ™-104PA available from Air Products) | 1.0 | 1.0 | 1.0 | 1.0 | 1.0 | 1.0 | 1.0 | 1.2 |
| Solvent (butyl cellosolve) | 1.0 | 1.0 | 0.5 | 0.0 | 1.0 | 0.0 | 1.5 | 1.0 |
| Solvent (butyl carbitol) | 0.5 | 0.5 | 0.5 | 8.0 | 1.5 | 8.5 | 1.0 | 0.7 |
| Solvent (Texanol ™ available from Eastman Chemicals) | 1.5 | 1.5 | 1.5 | 1.5 | 1.5 | 1.5 | 1.5 | 2.0 |
| Ultraviolet radiation stabilizer (Tinuvin ™-123 available from Ciba Geigy) | 0.1 | 0.1 | 0.1 | 0.1 | 0.1 | 0.1 | 0.1 | 0.1 |
| Ultraviolet radiation absorber (Tinuvin ™-1130 available from Ciba Geigy) | 0.3 | 0.3 | 0.3 | 0.3 | 0.3 | 0.3 | 0.3 | 0.3 |
| Biocide (Troysan ™-192 available from Troy Chemicals) | 0.1 | 0.1 | 0.1 | 0.1 | 0.1 | 0.1 | 0.1 | 0.1 |
| Fungicide (Polyphase ™-AF-1 available from Troy Chemicals) | 0.2 | 0.2 | 0.2 | 0.2 | 0.2 | 0.2 | 0.2 | 0.2 |
| Defoamer (Byk ™-024 available from BYK Chemie) | 0.9 | 0.9 | 0.9 | 0.9 | 1.0 | 1.0 | 1.0 | 0.9 |
| Neutralizer (Amp ™-95 available from Angus Chemical) | 0.2 | 0.2 | 0.2 | 0.2 | 0.2 | 0.2 | 0.2 | 0.2 |
| Black pigment (Aqualour ™UK-20 available from Penn Color) | 14.7 | 0.0 | 0.0 | 0.0 | 0.0 | 0.0 | 0.0 | 0.0 |
| Blue pigment (Aqualour ™UB-17 available from Penn Color) | 0.0 | 22.3 | 0.0 | 0.0 | 0.0 | 22.4 | 0.0 | 0.0 |
| White pigment (Aqualour ™UW-01 available from Penn Color) | 0.0 | 0.0 | 21.5 | 0.0 | 0.0 | 0.0 | 0.0 | 0.0 |
| Violet pigment (Aqualour ™UR-16 available from Penn Color) | 0.0 | 0.0 | 0.0 | 25.5 | 0.0 | 0.0 | 25.3 | 0.0 |
| Green pigment (Aqualour ™UG-19 green available from Penn Color) | 0.0 | 0.0 | 0.0 | 0.0 | 21.1 | 0.0 | 0.0 | 23.0 |

TABLE 1-continued

| COMPONENT | EXAMPLE | | | | | | | |
|---|---|---|---|---|---|---|---|---|
| | 1 | 2 | 3 | 4 | 5 | 6 | 7 | 8 |
| Pearlescent material (Mearlin™ Fine Blue 139V available from Mearle Co.) | 0.0 | 1.0 | 0.0 | 0.0 | 0.0 | 0.0 | 0.0 | 0.0 |
| Pearlescent material (Mearlin™ Super Red 439Z available from Mearle Co.) | 0.0 | 0.0 | 0.0 | 1.0 | 0.0 | 0.0 | 1.0 | 0.0 |
| Pearlescent material (Mearlin™ Super Green 839V available from Mearle Co.) | 0.0 | 0.0 | 0.0 | 0.0 | 1.0 | 0.0 | 0.0 | 1.0 |
| Final color | Black | Pearl. Blue | White | Pearl. Violet | Pear. Green | Blue | Pearl. Violet | Pearl. Green |
| Solids content (wt. %) | 28.5 | 31.3 | 35.3 | 28.0 | 30.8 | 29.8 | 28.0 | 31.4 |
| Volatile organic carbon contet (%) | 3.5 | 3.5 | 3.0 | 10.0 | 4.5 | 10.5 | 4.5 | 4.2 |
| Pigment/binder ratio (# parts pigment/100 parts binder) | 20.2 | 43.9 | 64.6 | 34.5 | 41.6 | 42.2 | 34.8 | 44.6 |

Pearl. = Pearlescent

EXAMPLE 9

Example 9 describes a preferred aqueous polyurethane-based surface layer formulation suitable for use in graphic articles intended for exterior applications.

| COMPONENT | PARTS |
|---|---|
| Neorez™ XR-9679 (Aqueous polyurethane dispersion from ICI) | 78.4 |
| Neorez™ XR-9649 (Aqueous polyurethane dispersion from ICI) | 8.9 |
| Ultraviolet radiation stabilizer (Tinuvin™-123 from Ciba-Geigy) | 0.3 |
| Ultraviolet radiation absorber (Uvinul™-539 from BASF) | 1.0 |
| Solvent (Butyl carbitol) | 9.5 |
| Triton™ GR-7M (Flow agent from Union Carbide) | 0.3 |
| Neocryl™ CX-100 (Crosslinking agent from ICI) | 1.6 |

EXAMPLE 10

Example 10 describes the preparation of a multilayer graphic article according to the invention comprising a clear, protective polyurethane-based surface layer that overlies a blue color layer and a pressure sensitive adhesive. The formulation of example 9 was wet coated onto a casting liner and dried for 2 minutes at 200° F. (93° C.), then 2 minutes at 250° F. (121° C.), and then 2 minutes at 300° F. (149° C.) to provide a 1 mil (25 µm) thick polyurethane-based surface layer. The color layer formulation of example 2 was then wet coated onto this surface layer and dried for 2 minutes at 150° F. (66° C.), then 2 minutes at 200° F. (93° C.), and then 2 minutes at 250° F. (121° C.) to obtain a 1 mil (25 µm) thick blue color layer. A 25 µm thick acrylate pressure sensitive adhesive previously coated onto a silicone release liner was transfer laminated to the color layer using a pair of nip rollers. The color layer was previously corona discharge treated at a net power of 500 Joules/second with a line speed of 18 centimeters/second. The color layer was then primed with a melamine acrylic. In this example, the adhesive layer provides the substrate on which the color layer is disposed even though the color layer was first applied to the protective surface layer.

EXAMPLE 11

Example 11 describes the preparation of a multilayer graphic article according to the invention and which comprises a pressure sensitive adhesive layer, first and second color layers disposed on the adhesive, and a clear, protective polyurethane-based surface layer overlying the color layers. More specifically, an acrylate pressure sensitive adhesive was coated onto a release liner to a dry thickness of about 25 µm. The color layer formulation of example 3 was then coated onto the adhesive and dried for 2 minutes at 150° F. (66° C.), then 2 minutes at 200° F. (93° C.), and then 2 minutes at 250° F. (121° C.) to provide a 1 mil (25 µm) thick dry white color layer.

The color layer formulation of example 6 was then screen printed onto the white color layer using ultrasonic humidification and a 157 mesh screen to provide a blue and white checker board pattern. The screen printed color layer was dried for 2 minutes at 175° F. (79° C.) and then for 2 minutes at 250° F. (121° C.). The polyurethane-based surface layer formulation of example 9 was then coated onto a presized acrylate coated casting liner and dried for 2 minutes at 200° F. (93° C.), then 2 minutes at 250° F (121° C.), and then 2 minutes at 300° F. (149° C.) to provide a 1 mil (25 µm) thick clear, protective layer. The surface layer was then laminated to the color layers under pressure and at a temperature of about 225° to 275° F. (107° to 135° C.).

EXAMPLE 12

Example 12 describes the preparation of a multilayer graphic article according to the invention and comprising a pressure sensitive adhesive layer, a polymeric film layer on the adhesive, first and second color layers on the film layer, and an overlying clear protective surface layer, the finished article having substantially the construction shown in FIG. 1. The polymeric film layer comprised a 1 to 2 mil (25 to 51 µm) thick extruded Surlyn™-1705 ionomer resin containing an ultraviolet radiation stabilizer package similar to that recommended by the polymer film resin manufacturer and comprising a pair of ultraviolet radiation absorbers, a hindered amine light stabilizer, and an antioxidant. The polymer film was then corona discharge treated at a net power of 500 Joules/second with a line speed of 18 centimeters/second. It was then laminated to a 25 µm thick acrylate pressure sensitive adhesive.

The color layer formulation of example 2 was then coated onto the surface of the polymer film layer not having adhesive and dried for 2 minutes at 150° F. (66° C.), then 2 minutes at 200° F. (93° C.), and then 2 minutes at 250° F. (121° C.) to provide a 1 mil (25 µm) thick blue color layer. The pearlescent green color layer formulation of example 5 was then screen printed onto the first color layer in a checker board pattern using ultrasonic humidification and a 157 mesh screen. This color layer was then dried using the profile of example 11 for the screen printed color layer for that example. The clear, protective polyurethane-based surface layer of example 9 was then cast onto a an acrylate presized casting liner, dried and laminated to the screen printed color layer using the procedure of example 11.

EXAMPLE 13

Example 13 describes the preparation of a multilayer graphic article according to the invention and similar to that described in example 11 but in which the polyurethane-based clear, protective surface layer is replaced by a surface layer provided by a 51 µm thick extruded Suryln™-1705 film such as described in example 12. The Surlyn™ protective surface layer was laminated to the screen printed color layer in the manner described in example 11 for the polyurethane-based surface layer. The graphic article of this example is particularly well suited for interior applications having less demanding weathering, abrasion and chemical resistance requirements.

EXAMPLE 14

Example 14 describes the preparation of a buried multilayer graphic article according to the invention and having essentially the construction illustrated in FIG. 2. More specifically, the multilayer graphic article of example 13 was prepared followed by the application of the polyurethane-based clear, protective surface layer of example 11, using the procedure of example 11 for this layer. The polyurethane-based protective surface layer was applied to the Surlyn™ polymer film layer. An ethylene acrylic acid primer (Adcote™-50T4983) was provided between the surface layer and the polymer film layer.

EXAMPLE 15

Example 15 illustrates the preparation of a multilayer graphic article according to the invention and having the construction described in example 12 with the exception that the polyurethane-based clear, protective surface layer was wet coated (rather than laminated) onto the color layers. The wet coated protective surface layer was dried for 2 minutes at 200° F. (93° C.) and then for 4 minutes at 250° F. (121° C.) to a 1 mil (25 µm) dry thickness.

The multilayer graphic articles of examples 10, 12 and 15 were subjected to the various tests described above to determine their utility for exterior uses. The results are shown below in Table 2.

TABLE 2

| TEST | EXAMPLE 10 | EXAMPLE 12 | EXAMPLE 15 |
| --- | --- | --- | --- |
| Surface layer adhesion | PASS | PASS | PASS |
| Color layer adhesion | NT | PASS | PASS |
| Salt Spray | PASS | PASS | PASS |
| Fuel Resistance | PASS | PASS | PASS |
| Gasoline Resistance | PASS | PASS | PASS |
| 10 Day water Immersion: | | | |
| Surface layer delamination | PASS | PASS | PASS |
| Adhesive layer delamination | PASS | PASS | PASS |
| Dimensional Stability | PASS | PASS | PASS |
| Heat Aging | PASS | PASS | PASS |

TABLE 2-continued

| TEST | EXAMPLE 10 | EXAMPLE 12 | EXAMPLE 15 |
| --- | --- | --- | --- |
| Acid Resistance | PASS | PASS | PASS |
| Gravel Resistance | PASS | PASS | PASS |
| Abrasion Resistance | PASS | PASS | PASS |
| Impact Resistance | PASS | PASS | PASS |
| Moisture Resistance | N.T. | PASS | PASS |
| Thermal/Environmental Cycling | N.T. | PASS | PASS |
| Accelerated Weathering | * | * | * |

NT = Not tested
* Data not available beyond approximately 1,000 hours of accelerated weathering. Graphic articles had not failed after 1,000 hours.

EXAMPLE 16

Example 16 describes the preparation of a multilayer graphic article according to the invention and comprising a pressure sensitive adhesive layer, a polymeric film layer on the adhesive, a white color layer on the film layer, and an overlying clear, protective surface layer. More specifically, the polymeric film layer of example 12 was corona discharge treated at a net power of 500 Joules/second with a line speed of 18 centimeters/second and laminated to a 25 µm thick acrylate pressure sensitive adhesive. The color layer formulation of example 3 was wet coated onto the surface of the polymeric film layer not having adhesive and dried for two minutes at 150° F. (66° C.), then 2 minutes at 200° F. (93° C.), and then 2 minutes at 250° F. (121° C.) to provide a 1 mil (25 µm) thick white color layer. The clear, protective polyurethane-based surface layer of example 9 was wet coated onto the white color layer and dried for 2 minutes at 200° F. (93° C.) and then for 4 minutes at 250° F. (121° C.) to a 1 mil (25 µm) dry thickness.

EXAMPLE 17

Example 17 describes the preparation of a multilayer graphic article according to the invention and having the construction described in example 16 with the exception that the white color layer was replaced by the blue pearlescent color layer formulation of example 2. Furthermore, the clear, protective polyurethane-based surface layer of example 9 was screened printed onto the color layer using a 60 mesh screen under ultrasonic humidification and dried for 30 minutes at 200° C.

EXAMPLE 18

Example 18 describes the preparation of a multilayer graphic article according to the invention and which comprises a pressure sensitive adhesive layer, a polymeric film layer on the adhesive, a green pearlescent color layer on the film layer, and an overlying clear, protective polyurethane-based surface layer. More specifically, the surface layer formulation of example 9 was wet coated onto a casting liner and dried for 2 minutes at 200° F. (93° C.), and 2 minutes at 250° F. (121° C.), and then 2 minutes at 300° F. (149° C.) to provide a 1 mil (25 µm) thick polyurethane-based surface layer. The green pearlescent color layer formulation of example 5 was then wet coated onto the surface layer and dried for 2 minutes at 150° F. (66° C.), then 2 minutes at 200° F. (93° C.), and then 2 minutes at 250° F. (121° C.) to obtain a 1 mil (25 µm) thick color layer. The polymeric film layer comprised a 1 to 2 mil (25 to 51 µm) thick extruded Surlyn™-1706 ionomer resin that did not contain a stabilizer package and which was laminated to the color layer under pressure and at a temperature of about 225° to 275° F. (107° C. to 135° C.). The exposed surface of the polymer film layer was corona discharge treated at a net power of 500 Joules/ second with a line speed of 18 centimeters/second and laminated to a 25 μm thick acrylate pressure sensitive adhesive.

EXAMPLE 19

Example 19 describes the preparation of a multilayer graphic article according to the invention and having the construction described in example 18 with the exception that the green pearlescent color layer was replaced by the black color layer formulation of example 1.

The multilayer graphic articles of examples 16 to 19 were subjected to 2,000 hours of accelerated weathering as described above. Each film passed.

EXAMPLE 20

Example 20 describes the preparation of a multilayer graphic article according to the invention and like that described in conjunction with example 11 but with several exceptions. First, the color layer formulation of example 3 was replaced with the color layer formulation of example 8 and the first stage of the 3 stage drying cycle was for 3 minutes rather than for 2 minutes. Furthermore, the color layer formulation of example 6 was replaced with the color layer formulation of example 7.

The multilayer graphic article of example 20 was subjected to several of the tests described above. The graphic article of this example passed the surface layer adhesion, gravel resistance and −30° C. impact resistance tests but failed the 10 day water immersion tests due to the surface layer having delaminated from first color layer and the adhesive layer having delaminated from the second color layer.

EXAMPLE 21

Example 21 illustrates the preparation of a multilayer graphic article according to the invention and having the construction described in example 20 with the exception that the polyurethane-based clear, protective surface layer was wet coated (rather than laminated) onto the color layers. The wet coated protective surface layer was dried for 2 minutes at 200° F. (93° C.) and then for 4 minutes at 250° (121° C.) to a 1 mil (25 μm) dry thickness.

Numerous variations and modifications are possible within the scope of the foregoing specification and drawings without departing from the invention which is defined in the accompanying claims.

The embodiments for which an exclusive property or privilege is claimed are defined as follows:

1. A multilayer graphic article comprising a substrate, at least one color layer disposed on the substrate, and a protective surface layer that overlies the substrate and the color layer, the color layer being intermediate the substrate and the surface layer and visible through the surface layer, wherein the substrate is a polymeric film formed from a material selected from the group consisting of alpha-olefins, ethylene-modified copolymers and terpolymers, polyurethanes and rubbery polymers, and further wherein the color layer comprises a color agent in a crosslinked copolymeric binder that is blended or supplemented with a polyurethane dispersion secondary binder, the copolymeric binder comprising the copolymerization product of an olefinic monomer and a second monomer having a pendant carboxyl group, the copolymeric binder having the formula:

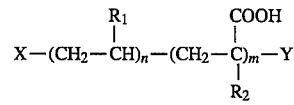

wherein $R_1$ is selected from the group consisting of hydrogen and $C_{1-6}$ alkyl groups; $R_2$ is selected from the group consisting of H, $C_{1-6}$ alkyl groups, $R_3$—COOH wherein $R_3$ is any alkyl group, —CN, and ester groups; X and Y are independently selected from the group consisting of residues of the olefinic monomer and residues of the second monomer; n is a number selected such that the olefinic monomer provides 99 to 70 mol-% of the copolymeric binder: and m is a number selected such that the second monomer correspondingly provides 1 to 30 mol-% of the copolymeric binder; the formula including basic salts thereof.

2. A multilayer graphic article according to claim 1 wherein n is a number selected such that the olefinic monomer provides from 91 to 97 mol-% of the copolymeric binder and further wherein m is a number selected such that the second monomer correspondingly provides from 9 to 3 mol-% of the copolymeric binder.

3. A multilayer graphic article according to claim 1 wherein the color layer has a melt index of 50 to 2000.

4. A multilayer graphic article according to claim 1 wherein the olefinic monomer is ethylene and the second monomer is either acrylic acid or methacrylic acid.

5. A multilayer graphic article according to claim 1 wherein the binder is crosslinked with a covalent crosslinking agent.

6. A multilayer graphic article according to claim 1 wherein the binder is crosslinked with an ionic crosslinking agent.

7. A multilayer graphic article according to claim 6 wherein the ionic crosslinking agent includes a metal cation.

8. A multilayer graphic article according to claim 7 wherein the crosslinking agent includes a zirconium ion.

9. A multilayer graphic article according to claim 1 wherein the color agent is selected from the group consisting of organic pigments, inorganic pigments, metallic flakes, pearlescent materials, inks and dyes.

10. A multilayer graphic article according to claim 1 wherein the polymeric film is an ionomer of an olefin/vinyl carboxylate copolymer.

11. A multilayer graphic article according to claim 10 wherein the polymeric film is an ionomer of an ethylene/ acrylic acid copolymer or an ionomer of an ethylene/ methacrylic acid copolymer.

12. A multilayer graphic article according to claim 1 further comprising an adhesive layer for bonding the graphic article to a surface.

13. A multilayer graphic article according to claim 12 wherein the adhesive layer is a pressure sensitive adhesive layer.

14. A multilayer graphic article according to claim 13 further comprising a removable liner for protecting the pressure sensitive adhesive layer.

15. A multilayer graphic article according to claim 1 wherein the substrate is a temporary, removable liner.

16. A multilayer graphic article according to claim 1 wherein the protective surface layer renders the graphic article weatherable.

17. A multilayer graphic article according to claim 1 wherein the protective layer renders the graphic article resistant to chemical exposure.

18. A multilayer graphic article according to claim 1 wherein the protective surface layer provides the graphic article with interior surface protection properties.

19. A multilayer graphic article according to claim 1 wherein the protective surface layer is a polyurethane-based material.

20. A multilayer graphic article according to claim 19 wherein the polyurethane-based material comprises the reaction product of an aliphatic diisocyanate and either a polyester polyol, a polycarbonate polyol, a polyacrylic polyol, or blends thereof.

21. A multilayer graphic article according to claim 1 wherein the protective surface layer is selected from the group consisting of the reaction products of aromatic diisocyanates and polyether polyols; ethylene/acrylic acid copolymers and ionomers thereof; ethylene/methacrylic acid copolymers and ionomers thereof; polyethylene terephthalate; polyethylene; ethylene/vinyl acetate; and ethylene/methylacrylate.

22. A multilayer graphic article according to claim 1 comprising at least two color layers, one disposed on the other and at least one of which is discontinuous.

23. An object having a multilayer graphic article according to claim 1 attached thereto.

24. An object according to claim 23 wherein the object is a motor vehicle.

25. A multilayer graphic article comprising a pressure sensitive adhesive layer for bonding the multilayer graphic article to a surface, at least one color layer disposed on the pressure sensitive adhesive layer, a polymeric film layer disposed over the color layer, and a protective surface layer that overlies the polymeric film layer, the color layer being visible through the polymeric film layer and the protective surface layer, wherein the color layer comprises a color agent in a crosslinked copolymeric binder that is blended or supplemented with a polyurethane dispersion secondary binder, the copolymeric binder comprising the copolymerization product of an olefinic monomer and a second monomer having a pendant carboxyl group, the copolymeric binder having the formula:

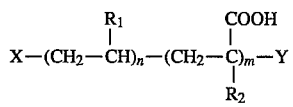

wherein $R_1$ is selected from the group consisting of hydrogen and $C_{1-6}$ alkyl groups; $R_2$ is selected from the group consisting of H, $C_{1-6}$ alkyl groups, $R_3$—COOH wherein $R_3$ is any alkyl group, —CN, and ester groups; X and Y are independently selected from the group consisting of residues of the olefinic monomer and residues of the second monomer; n is a number selected such that the olefinic monomer provides 99 to 70 mol-% of the copolymeric binder; and m is a number selected such that the second monomer correspondingly provides 1 to 30 mol-% of the copolymeric binder; the formula including basic salts thereof.

26. A multilayer graphic article according to claim 25 wherein the color layer has a melt index of 50 to 2000.

27. A multilayer graphic article according to claim 25 wherein the olefinic monomer is ethylene and the second monomer is either acrylic acid or methacrylic acid.

28. A multilayer graphic article according to claim 25 wherein the binder is crosslinked by a metal cation.

29. A multilayer graphic article according to claim 28 wherein the metal cation is a zirconium ion.

30. A multilayer graphic article according to claim 25 wherein the polymeric film layer is an ionomer of an ethylene/acrylic acid copolymer or an ionomer of an ethylene/methacrylic acid copolymer.

31. A multilayer graphic article according to claim 25 wherein the protective surface layer renders the graphic article weatherable.

32. A multilayer graphic article according to claim 25 wherein the protective surface layer comprises the reaction product of an aliphatic diisocyanate and either a polyester polyol, a polycarbonate polyol, a polyacrylic polyol, or blends thereof.

33. A multilayer graphic article according to claim 25 wherein the protective surface layer is selected from the group consisting of the reaction products of aromatic diisocyanates and polyether polyols; ethylene/acrylic acid copolymers and ionomers thereof; ethylene/methacrylic acid copolymers and ionomers thereof; polyethylene terephthalate; polyethylene; ethylene/vinyl acetate; and ethylene/methacrylate.

34. A multilayer graphic article according to claim 25 comprising at least two color layers, one disposed on the other and at least one of which is discontinuous.

35. A multilayer graphic article according to claim 25 that is bonded to a motor vehicle by the pressure sensitive adhesive layer.

* * * * *

UNITED STATES PATENT AND TRADEMARK OFFICE
CERTIFICATE OF CORRECTION

PATENT NO.: 5,468,532

DATED: November 21, 1995

INVENTOR(S): Chia-Tie Ho et al.

It is certified that error appears in the above-identified patent and that said Letters Patent is hereby corrected as shown below:

Col. 1, line 31, insert --organic-- after "volatile".

Col. 4, line 9, insert --the-- after "to".

Col. 4, line 30, "MICAG™- 927" should read --MICA™G-927--

Col. 4, line 36, insert --salts-- after "basic".

Col. 5, line 26, insert --zirconium-- before "silicate".

Col. 5, line 55, insert --thermoplastic-- before "olefins,".

Col. 6, line 16, insert --pigments,-- between "plasticizers," and "metallic".

Col. 7, line 36, insert --construction-- between "the" and "of".

Col. 8, line 28, insert --layer(s)-- after "color".

Col. 8, line 56, insert --may-- after "invention".

Col. 15, line 6, delete "a".

Signed and Sealed this

Twenty-ninth Day of December, 1998

Attest:

BRUCE LEHMAN

Attesting Officer

Commissioner of Patents and Trademarks